United States Patent Office 3,300,378
Patented Jan. 24, 1967

3,300,378
DISINFECTANT AND ANTI-INFLAMMATORY COMPOSITION AND METHOD OF USING SAME
Rudolf Fischer, Sandbuhl, Kehrsatz, near Bern, Switzerland, assignor to Dr. A. Wander, S.A., Bern, Switzerland, a Swiss corporation
No Drawing. Filed Oct. 25, 1962, Ser. No. 233,152
Claims priority, application Switzerland, Mar. 24, 1960, 3,315/60
3 Claims. (Cl. 167—65)

This is a continuation-in-part to my copending application, Serial No. 117,248, filed March 22, 1961, now abandoned.

This invention relates generally to compositions of matter for use in human and veterinary medicine, and more particularly to a pharmaceutical composition suitable as an intestinal and wound disinfectant and anti-inflammatory agent which comprises 6-chloro-1,2-benzisothiazolone as the active compound. It relates also to a method of preventing or combating intestinal and wound infections and inflammations of the skin and mucous membrane by oral or local administration of 6-chloro-1,2-benzisothiazolone in a suitable pharmaceutical form.

Certain derivatives of benzisothiazolone are known to exert a growth-inhibiting or lethal action against a wide spectrum of microorganisms like bacteria, fungi and protozoa. A fairly large number of such compounds were investigated by us for their suitability as antiseptics and as intestinal disinfectants. As regards the growth-inhibiting action the following regular features were found:

(1) An intense and broad action appears only on substitution of benzisothiazolone in the positions 2, 5 or 6; substituents in 4- or 7-position however diminish the effect.

(2) Monosubstituted products exert the best effect; a second substituent reduces the action.

Of the benzisothiazolones monosubstituted in 2-, 5- or 6-position, the previously known 5-chloro-1,2-benzisothiazolone and the new 6-chloro-1,2-benzisothiazolone showed the broadest range of action (microbiologic spectrum) coupled with the greatest intensity of effect, the bactericidal or bacteriostatic properties of 6-chloro-1,2-benzisothiazolone being considerably superior to those of the 5-isomer against various germs. On the other hand, 6-chloro-1,2-benzisothiazolone orally is roughly 4 times less toxic than 5-chloro-1,2-benzisothiazolone and thus possesses a decisive advantage over the latter as an intestinal disinfectant. These properties of the 6-chloro-1,2-benzisothiazolone in comparison with the previously known 5-isomer are more specifically shown by the figures given in the following table. In this table, the action on various microorganisms is expressed in terms of the limit concentration of the active substance in gm. per ml., which still inhibits growth of said microorganisms. The oral toxicity tests were performed on mice using alkaline solutions of the test substances.

Comparison shows that 6-chloro-1,2-benzisothiazolone has equivalent or superior activity against most germs of a representative selection, while its oral toxicity is roughly four times less than that of the previously known compound. Besides possessing these advantages over 5-chloro-1,2-benzisothiazolone as an intestinal disinfectant, 6-chloro-1,2-benzisothiazolone is eminently suited as an agent for combating inflammations of the skin and mucous membrane and as a wound disinfectant, for example in the form of ointment, dusting powder and spray.

The novel 6-chloro-1,2-benzisothiazolone, which is suitable as an antiseptic, anti-inflammatory agent and especially as an oral intestinal disinfectant, is represented by the following Formula I:

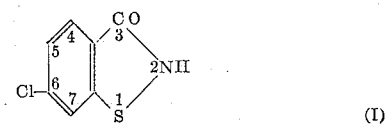

(I)

The preparation of 6-chloro-1,2-benzisothiazolone may be carried out in a way known per se by either (a) reacting a compound of the general Formula II:

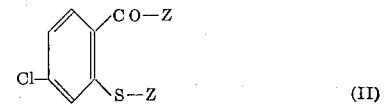

(II)

in which Z denotes a group capable of reacting with a hydrogen atom linked to the nitrogen atom of ammonia, with ammonia, or (b) condensing to ring closure through cleavage of HZ a compound according to Formula II, in which one of the two Z radicals is replaced by an amino group, or (c) treating 4,4'-dichloro-2,2'-dithiosalicylic acid diamide with a diluted aqueous base.

The synthesis of 6 - chloro - 1,2 - benzisothiazolone is preferably carried out by reacting a compound according to Formula II, in which Z denotes a halogen atom like bromine or chlorine, with ammonia in the presence of an inert solvent like carbon tetrachloride or chloroform and of a hydrogen halide-binding agent. The reaction can also be carried out in the heterogeneous phase, for example by treating the solution of a compound according to Formula II in an organic solvent with aqueous ammonia solution or by introducing gaseous ammonia into the former. As a hydrogen halide-binding agent, ammonia itself, which must then be used in three times the equivalent quantity, or a basic solvent like pyridine can be employed.

Where one of the Z radicals in Formula II is an amino group, warming is generally sufficient to bring about ring closure. In this case the other Z radical is preferably a chlorine atom. A starting material according to Formula II in which Z denotes a chlorine atom is ob-

| Compound | Action | | | | | | | | | Oral toxicity | | |
|---|---|---|---|---|---|---|---|---|---|---|---|---|
| | Limit concentration (gm./ml.) for— | | | | | | | | | LD₅₀, mg./ kg. | Tolerated dose, mg./ kg. | Max. LD, mg./ kg. |
| | Staphylococcus aureus | Escherischia coli | Pseudomonas pyocyanea | Trichophyton radians | Trichophyton rubrum | Trichophyton schonleini | Monilia albicans | Aspergillus niger | Trichomonas fetus | | | |
| 6-chloro-1,2-benzisothiazolone | 1/150,000 | 1/40,000 | 1/10,000 | 1/200,000 | 1/200,000 | 1/200,000 | 1/60,000 | 1/1,000 | 1/10,000 | 1,400 | 1,000 | 2,150 |
| 5-chloro-1,2-benzisothiazolone | 1/50,000 | 1/10,000 | 1/10,000 | 1/20,000 | 1/20,000 | 1/100,000 | 1/50,000 | 1/1,000 | 1/10,000 | 390 | 215 | 681 | tained, for example, by treating acid chloride disulphide of Formula III:

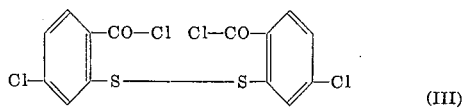

with chlorine. If, prior to treatment with chlorine, this acid chloride disulphide is reacted with ammonia, there is obtained 2 - chloro - mercapto - 4 - chloro-benzoic acid amide, which can also be used as a starting material.

*Example 1*

A solution of 20 gm. of 2-chloromercapto-4-chloro-benzoylchloride in 150 ml. of carbon tetrachloride is added to 150 ml. of a vigorously stirred and cooled 25% aqueous solution of ammonia. The mixture is allowed to react for 30 minutes at room temperature, 2 N sodium hydroxide solution is then added until dissolution takes place, the carbon tetrachloride layer is removed and acidification is carried out. The precipitated product is drawn off by suction, washed with water and precipitated from diluted sodium hydroxide solution with diluted hydrochloric acid. There are obtained 11 gm. of white 6-chloro-1,2-benzisothiazolone with the melting point 270° to 272° C.

*Example 2*

10 gm. of 4,4'-dichloro-2,2'-dithiosalicylic acid diamide are stirred at 50° C. in 50 ml. of 2 N sodium hydroxide solution until dissolution occurs. The solution is allowed to cool and 25 ml. of saturated sodium chloride solution are added. The precipitated sodium salt of 6-chloro-1,2-benzisothiazolone is drawn off by suction, washed with brine, dissolved in about 100 ml. of water and precipitated with an excess of 2 N hydrochloric acid. There are obtained 6.5 gm. of 6-chloro-1,2-benzisothiazolone with the melting point 270° to 272° C.

*Example 3*

18.6 gm. of 4,4'-dichloro-2,2'-dithiosalicylic acid diamide are suspended in 100 ml. of carbon tetrachloride and, while stirring, a solution of 8 gm. of bromine in 50 ml. of carbon tetrachloride is added drop by drop. After 30 minutes the orange product is drawn off by suction, suspended in 100 ml. of glacial acetic acid and boiled until dissolution occurs. 500 ml. of water are added, the solution is cooled and the product is drawn off by suction. There are obtained 13.5 gm. of 6-chloro-1,2-benzisothiazolone of melting point 269° to 271° C.

If the 2 - bromomercapto - 4 - chloro - benzoic acid amide obtained above is allowed to lie exposed to the air, ring closure likewise occurs with hydrogen bromide being split off. By warming gently the process of conversion can be ended even during the course of 2 to 3 hours.

*Example 4*

9.9 gm. of *Unguentum hydrophilicum* USP 16 and 0.1 gm. of 6-chloro-1,2-benzisothiazolone are reduced to a fine powder and mixed. There is obtained an ointment for external application, which has an excellent therapeutic effect, for example, in pyoderma, dermatomycosis, ulcers and the like.

*Example 5*

By mixing intimately 9.85 gm. of talcum and 0.15 gm. of 6-chloro-1,2-benzisothiazolone in finely pulverized form there is obtained a powder for external application, e.g., for the treatment of wounds.

If in this powder lactose is substituted for talcum there is obtained a disinfectant powder for surgical use.

*Example 6*

150 mg. of 6-chloro-1,2-benzisothiazolone are dissolved in a mixture of 4 ml. of isopropyl alcohol, 0.2 ml. of acetone and 2 ml. of hexylene glycol. As a propellant 75 gm. of freon are added and the liquid is introduced into a spray bottle. The spray is used for the disinfection of wounds.

*Example 7*

200 gm. of 6-chloro-1,2-benzisothiazolone and 150 gm. of aluminium hydroxide are mixed in a finely pulverized state and granulated in the presence of a little water and sodium alginate. The dried granulate is compressed, in the presence of 75 gm. of maize powder as well as 75 gm. of talcum and a small quantity of magnesium stearate, into tablets weighing 500 mg. each. These tablets are used for intestinal disinfection, excellent results being obtained in adults with 1 to 2 tablets a day.

I claim:
1. A method of preventing and combating inflamations of the skin and mucous membranes and wound infections of a living animal which comprises applying 6-chloro-1,2-benzisothiazolone locally to a living animal in a pharmaceutically acceptable form.

2. A method of preventing and combating intestinal infections of a living animal which comprises administering 6-chloro-1,2-benzisothiazolone orally to a living animal in non-toxic pharmaceutically acceptable dosage form.

3. A pharmaceutical composition which comprises a therapeutically useful amount of 6-chloro-1,2-benzisothiazolone as an essential active ingredient having disinfectant and anti-inflammatory action admixed with a physiologically acceptable pharmaceutical carrier.

References Cited by the Examiner
UNITED STATES PATENTS

| | | | |
|---|---|---|---|
| 2,767,174 | 10/1956 | Katz et al. | 260—304 |
| 2,870,015 | 1/1959 | Allen et al. | 260—304 |
| 3,065,123 | 11/1962 | Hinton | 162—161 |

OTHER REFERENCES

Katz: Chem. Abst., vol. 49, col. 3161, 1955.
McClelland et al.: Chem. Abst., vol. 42, p. 908, 1948.
Zinsser: Textbook of Bacteriology, 7th ed., 1934, Appleton, Century Co., New York, N.Y., p. 303.
Schwartz: Surface Active Agents, 1949, Interscience Publishers, Inc., New York, N.Y., pp. 116 and 117.

JULIAN S. LEVITT, *Primary Examiner.*

MORRIS O. WOLK, LEWIS GOTTS, *Examiners.*

P. SABATINE, S. ROSEN, *Assistant Examiners.*